United States Patent [19]
Udd

[11] Patent Number: 5,636,021
[45] Date of Patent: Jun. 3, 1997

[54] SAGNAC/MICHELSON DISTRIBUTED SENSING SYSTEMS

[76] Inventor: Eric Udd, 2555 NE. 205th Ave., Troutdale, Oreg. 97060

[21] Appl. No.: 458,781

[22] Filed: Jun. 2, 1995

[51] Int. Cl.$^6$ ................................................. G01B 9/02
[52] U.S. Cl. ............................................................. 356/345
[58] Field of Search .................................. 356/345, 350; 250/227.19, 227.27

[56] References Cited

U.S. PATENT DOCUMENTS

| | | | |
|---|---|---|---|
| 4,787,741 | 11/1988 | Udd | 356/345 |
| 4,853,534 | 8/1989 | Dakin | 356/345 |
| 4,898,468 | 2/1990 | Udd. | |
| 5,046,848 | 9/1991 | Udd. | |
| 5,311,592 | 5/1994 | Udd. | |
| 5,355,208 | 10/1994 | Crawford et al. | 356/345 |

OTHER PUBLICATIONS

"Fiber Optic Smart Structures" 1995, Udd, pp. 401–407.
"Tension & Compression Measurements in Composite Utility Poles Using Fiber Optic Grating Sensors", Udd et al, SPIE, Aug. 1995, pp 14–19.
"Sagnac Distributed Sensor Consepts", Udd, SPIE, Aug. 1992, pp 46–52.
"A Novel Distributed Optical Fiber Sensing System Enabling Location of Disturbances in a Sagnac Loop Interferometer".
Dakin et al, SPIE, 1997, pp 325–328.

*Primary Examiner*—Samuel A. Turner
*Attorney, Agent, or Firm*—George W. Finch

[57] ABSTRACT

A Sagnac/Michelson distributed sensor is described that is capable of locating the position and amplitude of a time varying environmental signal as well as measuring locally and regionally slowly varying environmental signals. The sensor consists of a Sagnac interferometric loop into which spectrally reflective elements that may be fiber gratings have been placed. A Sagnac interferometric signal derived from counterpropagating beams in the Sagnac loop is used in combination with signals derived from reflected light beams off the spectrally reflective elements in the Sagnac loop which are combined in Michelson interferometer readouts to allow the measurement of environmental signals. Applications of the Sagnac/Michelson sensor include the measurement strains and acoustic sources in buildings, bridges, dams and aerospace platforms. Other applications include the localization of insect infestations in grain storage areas and termites in wooden structures.

20 Claims, 13 Drawing Sheets

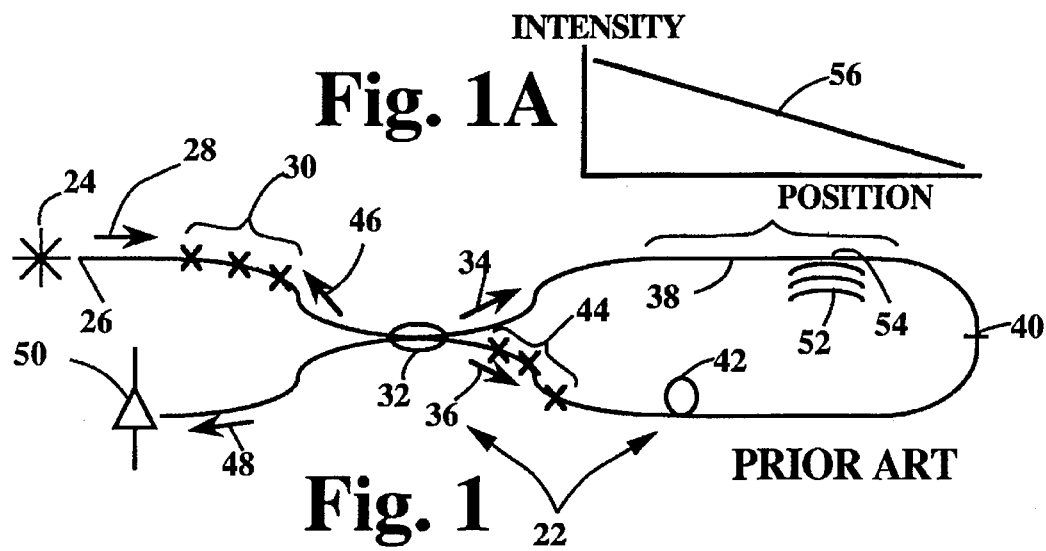
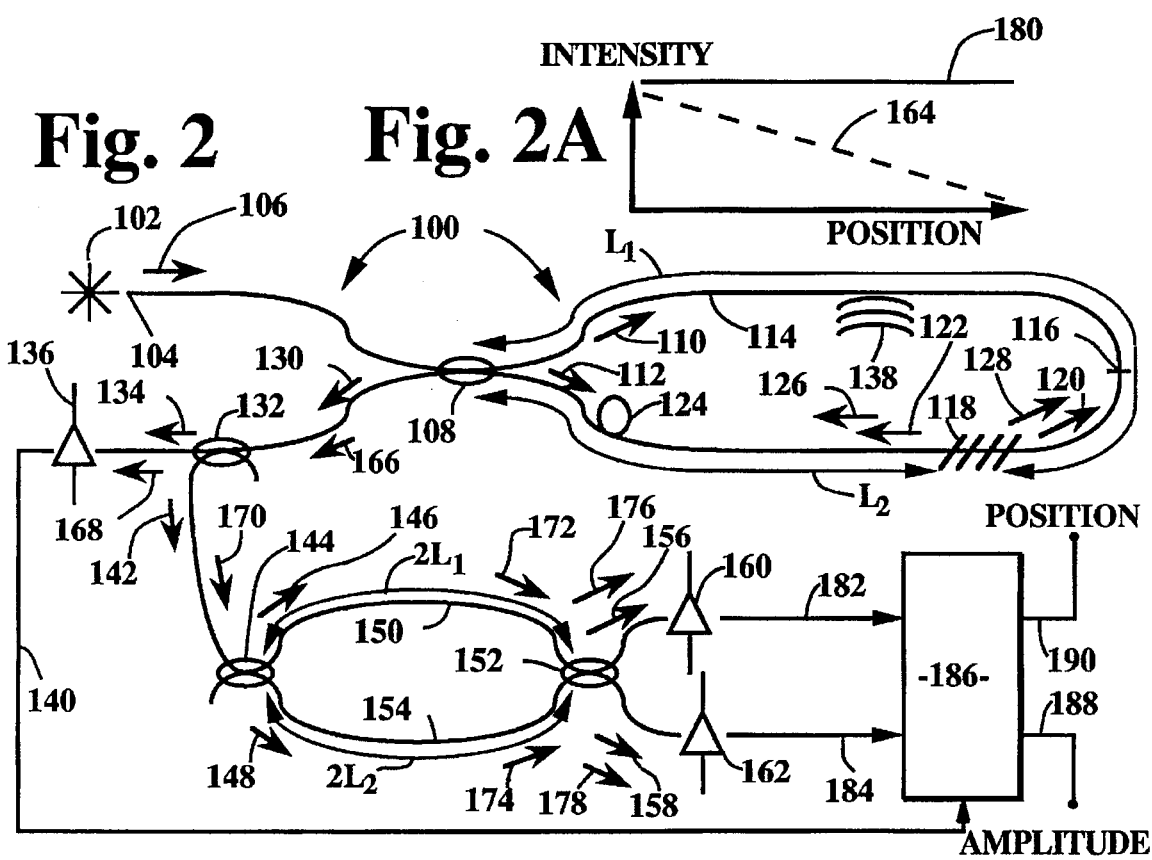

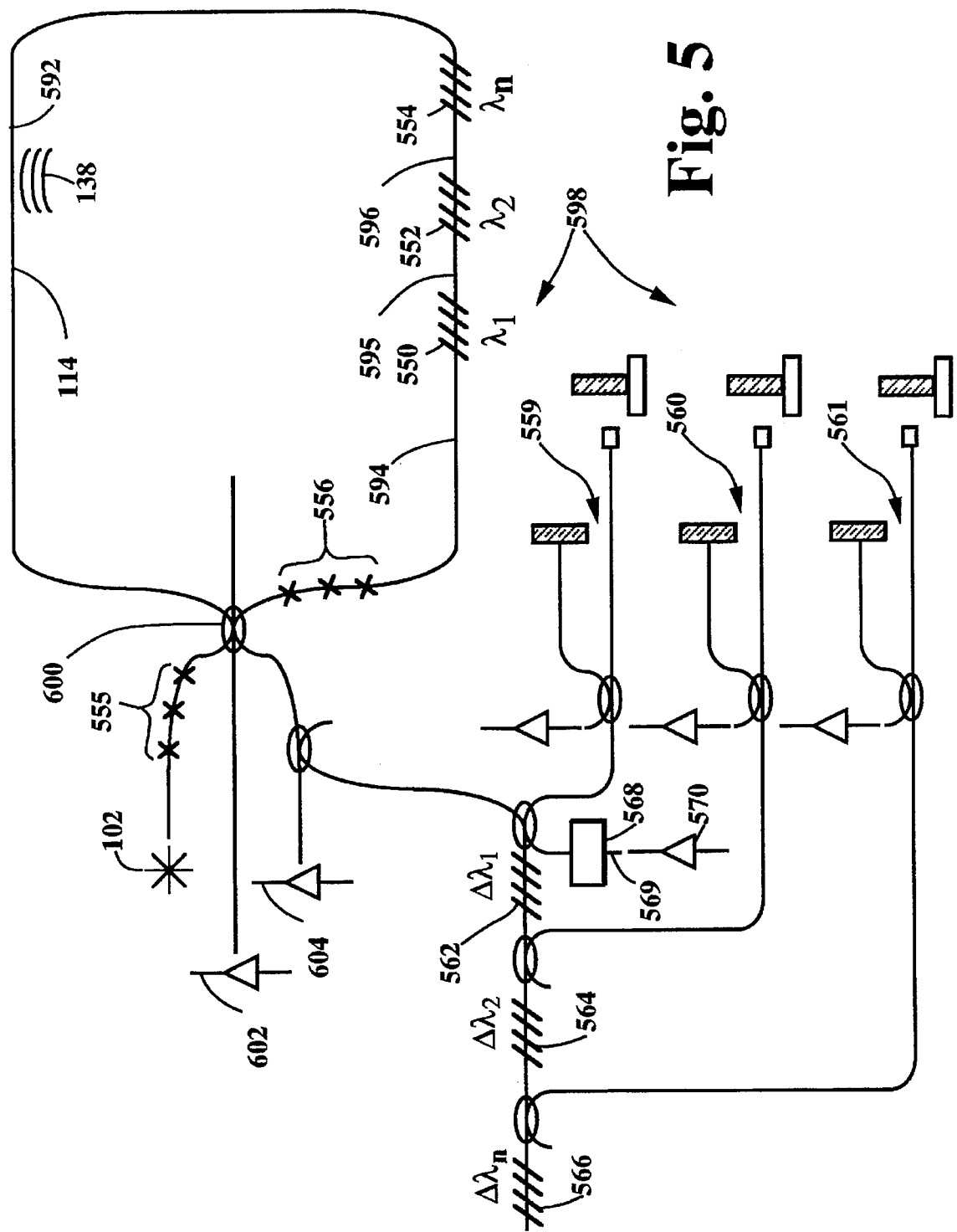

SAGNAC/MICHELSON DISTRIBUTED SENSING SYSTEMS

BACKGROUND OF THE INVENTION

There is a need for an accurate and responsive environmental sensor system that can locate the position and measure the amplitude of a time varying disturbance. There is also a need for strain sensors capable of measuring strain over both short and long gauge lengths. Applications of this type of sensor system would include the location and identification of vibrational disturbances in an aircraft or space structure as well as absolute strain measurements throughout the structure. These structures, in order to perform their mission, must be able to provide a continuous indication of their status in real time. Civil structure applications of this sensor would include the measurement of strain and acoustic disturbances throughout a bridge, building or highway structure. Agricultural applications would include the location of insect infestations in a grain storage area and localization of termite infestations in wooden housing structures. These sensors could also be used to support systems that could be used to identify structural damage to residential and business building after a disaster such as an earthquake or hurricane.

J. P. Dakin et. al. in "A Novel Distributed Optical Fibre Sensing System Enabling Location of Disturbances in a Sagnac Loop Interferometer", SPIE Proceedings, Volume 838, p. 325, 1987 describe a combination of a Sagnac and Mach-Zehnder interferometer that is used to locate the position of a time varying disturbance. There are a number of issues associated with this approach, the most serious of which is that optimum operation of the Sagnac and Mach-Zehnder interferometer in the configuration employed by Dakin et. al. requires two very different light sources. The Sagnac interferometer operates optimally with a low coherence length light source while the Mach-Zehnder would ideally be operated with a long coherence length, frequency stable light source. Further complicating matters is the Mach-Zehnder/Sagnac distributed sensor as described by Dakin results in light from the light source being directly reflected back into the light source, which without costly steps to provide suitable isolation, will result in a degradation of the light source stability and raising of the system noise floor. To circumvent this situation E. Udd in "Sagnac Distributed Sensor Concepts", Proceedings of SPIE, Volume 1586, p. 46, 1991, "Sagnac Distributed Sensor", U.S. Pat. No. 4,898,468, "Fiber Optic Detection System Using a Sagnac Interferometer", U.S. Pat. No. 5,046,848 and "Sagnac Based Secure Communication System", U.S. Pat. No. 5,311,592 describes a series of embodiments of distributed sensors based on the Sagnac interferometer that employ low coherence length light sources enabling optimum system performance.

One of these systems described by E. Udd in "Sagnac Distributed Sensor", U.S. Pat. No. 4,898,468 has the capability of making strain measurements over the entire Sagnac loop. To accomplish this, a frequency shifter that requires electrical power has been added to the Sagnac loop.

For many applications such as bridges, buildings, and aerospace platforms, it is highly desirable to have a system that is passive and has the ability to measure strain locally as well as over long gauge lengths while retaining the ability to locate and measure the amplitude of time varying effects.

BRIEF DESCRIPTION OF THE PRESENT INVENTION

In the present invention a Sagnac distributed sensing system is constructed to measure the amplitude and position of a time varying environmental effect. This system can also be configured to measure slowly varying environmental phenomena and in particular strain over both short and long gauge lengths as required by the application.

Each of the sensor systems disclosed herein uses a light source that may be relatively broadband and one or more relatively narrow band spectral reflection elements that may be fiber gratings that are placed into a Sagnac loop. The Sagnac interferometer output is monitored by a detector and its response to time varying environmental effects upon a portion of the optical fiber in the Sagnac loop will be position and frequency dependent. Reflections of a portion of the system light source by the narrow band spectral reflectors result in the creation of a Michelson interferometer that has a flat response to environmental changes along its length with respect to position and frequency. For time dependent environmental effects the ratio of these two signals may be used to determine position, and the amplitude of the signal may be determined from the Michelson output. The Michelson interferometers thus formed may also be used to measure slowly varying environmental effects including strain directly.

The spectral reflectors in the Sagnac loop are in general, relatively narrow band when compared to the system light source and consequently generate light beams with a relatively long coherence length. In order to avoid cross talk between the Sagnac interferometer and the Michelson interferometers formed by the system, the spectral reflectors, which may be fiber gratings, are offset from the center of the Sagnac loop by a length that is greater than the coherence length of the reflected beams. After exiting the Sagnac loop, a portion of the combined light beams is then directed into a compensating Mach-Zehnder or Michelson interferometer so that the beams can be coherently combined and the environmental signal recovered.

In some embodiments the Sagnac loop is biased for optimum response to time varying environmental effects. This may be done by dynamically biasing the Sagnac loop using a phase modulator in a manner similar to that employed for fiber rotation sensors. Another configuration uses a 3 by 3 coupler to provide passive biasing, again in analogy to that employed with fiber optic rotation sensors.

The present system can be used to support multiple measurements of strain by using multiple spectral reflectors that may be fiber gratings in the Sagnac loop. This can be done as a separate function or in addition to detection of the location and position of time varying environmental effects.

Therefore, it is an object of the invention to provide sensor systems including a Sagnac interferometer with spectral reflectors in the Sagnac loop to form one or more Michelson interferometers for smart structures capable of performing self diagnostics.

Another object of the invention is to provide an environmental sensor system capable of measuring the amplitude and position of a time varying environmental signal.

Another object of the invention is to provide an environmental sensor capable of measuring strain locally as well as over large gauge lengths.

Another object of the invention is to provide a system that can measure increase in strain locally and over long lengths on railroad tracks and also provide information on the location and extent of damage to tracks via its acoustic detection capabilities as trains pass over damaged tracks.

Another object of the invention is to locate insect infestations in grain storage areas as well as provide structural health information.

Another object of the invention is to locate termite infestations in wooden buildings and structures as well as provide structural integrity information.

Another object of the invention is to provide structural information on highways that would allow the determination of the weight and speed of vehicles as they pass as well as the determination of the location and severity of damage areas such as potholes via acoustic signatures.

Another object of the invention is to provide structural information on the integrity of dams in order to alert the user of the need to take corrective actions.

Another object of the invention is to provide a structural and damage assessment sensor for bridges that will also monitor vehicular traffic.

These and other objects and advantages of the present invention will become apparent to those skilled in the art after considering the following detailed specification and the accompanying sheets of drawings wherein:

BRIEF DESCRIPTION OF THE DRAWINGS

FIG. 1 is a diagram of a prior art Sagnac sensor with position and frequency dependent output for time varying environmental signals.

FIG. 1A is a graph of intensity versus position about the Sagnac loop of the sensor of FIG. 1.

FIG. 2 is a diagram that illustrates a Sagnac interferometer with a spectral reflector placed in the Sagnac loop to form a Sagnac/Michelson sensing system with a Mach-Zehnder interferometric readout detection system.

FIG. 2A is a graph of intensity versus position for the Sagnac loop of the sensor system of FIG. 2.

FIG. 5 is an optical circuit diagram of a Sagnac interferometer with a 3 by 3 coupler for passive biasing and multiple spectral reflectors placed in the Sagnac loop to form a Sagnac/Michelson sensor system using multiple variable Michelson interferometers as readout detection systems.

DETAILED DESCRIPTION OF THE SHOWN EMBODIMENTS

Figure 2B:
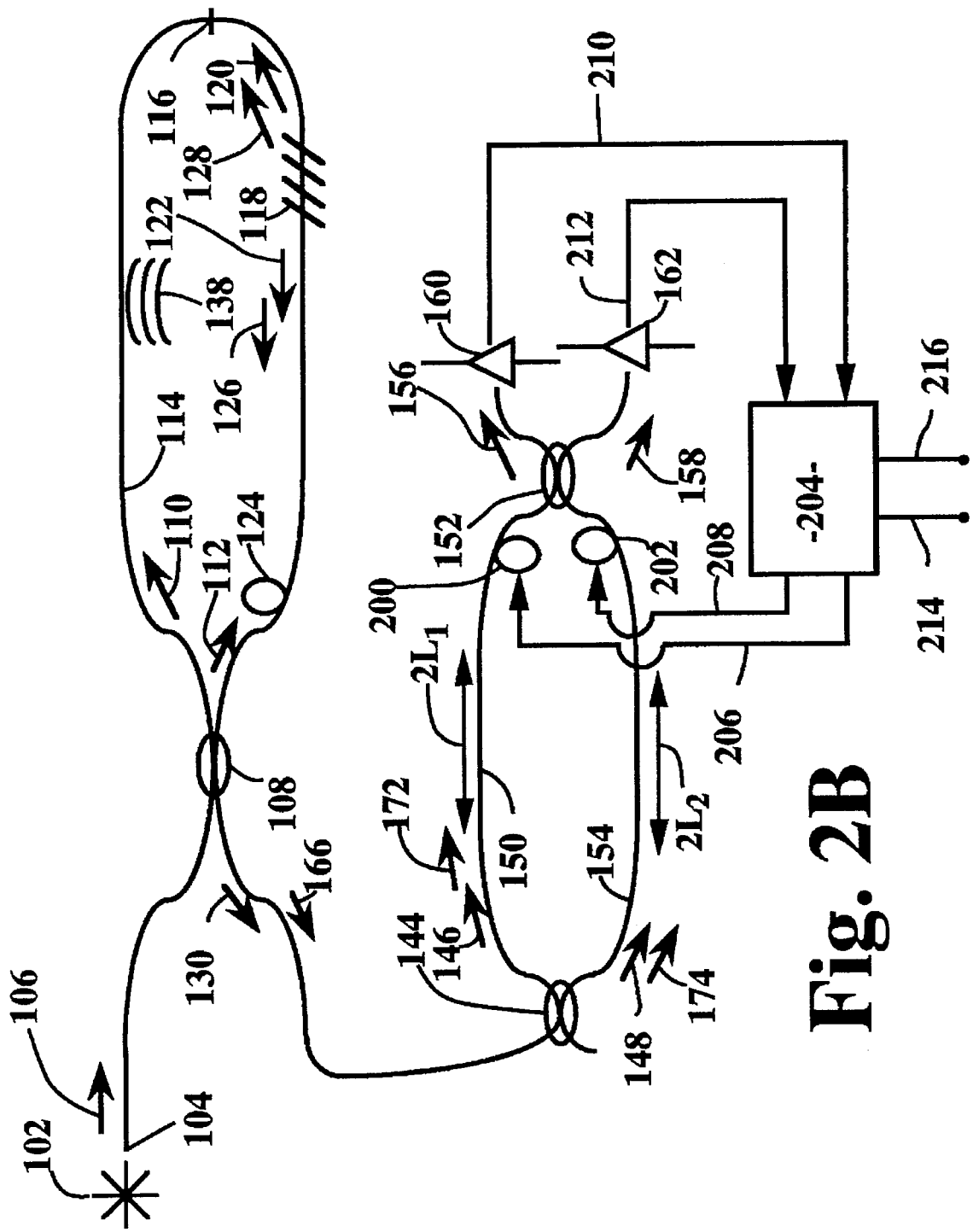
FIG. 2B is a diagram that illustrates a Sagnac interferometer with a spectral reflector placed in the Sagnac loop to form a Sagnac/Michelson sensing system with a Mach-Zehnder interferometric readout detection system that has variable length legs and uses scanning methods.

Referring to the drawings more particularly by reference numbers, number 22 refers to a basic prior art Sagnac interferometric sensor with position dependent response to time varying environmental effects. The sensor consists of a light source 24 that couples the light into the fiber end 26 to form the light beam 28. The light beam 28 then passes through a Lyot depolarizer 30 that is used to scramble the polarization states of the light beam 28 and whose purpose is to avoid signal fade out in the sensor 22. If polarization preserving fiber is used throughout the sensor 22 or the light source 24 is depolarized, the depolarizer 30 need not be used. Instead the depolarizer 30 would be used if the fiber deployed throughout the sensor 22 consisted mostly of conventional single mode optical fiber and the light source 24 were at least partially polarized. The light beam then continues on to the central beamsplitter 32 where the counterpropagating light beams 34 and 36 are generated. The light beam 34 then passes through the Sagnac loop 38, passing the center 40 of the Sagnac loop 38, a phase modulator 42 that may be used to dynamically bias the Sagnac loop for optimal sensitivity in analogy to dynamic biases applied to fiber optic gyros, and a second Lyot depolarizer 44 that is placed in the Sagnac loop 38. The Lyot depolarizer 44 is unnecessary if the sensor 22 uses polarization preserving fiber throughout. The light beam 34 then returns to the central beamsplitter 32. The counterclockwise propagating light beam 36 traverses the elements 44, 42 and 40 in the Sagnac loop 38 in the opposite direction arriving at the central beamsplitter 32. The two light beams 34 and 36 then combine and if the two beams 34 and 36 are in phase, all the light is directed into the beam of light 46 toward the light source 24. If the two light beams 34 and 36 are 180 degrees out of phase with respect to each other when they recombine on the beamsplitter 32, all the light is directed into the light beam 48 which propagates to the output detector 50.

When a time varying environmental effect 52, which may be an acoustic wave, impinges on a portion of the Sagnac loop 38, it causes the optical fiber at the location 54 to be modulated in path length with a time variation corresponding to the environmental signals time variation. This in turn sets up a net phase difference between the light beams 34 and 36 that depends upon the amplitude, frequency and position of the time varying environmental effect 52. In particular at the center 40 of the Sagnac loop 38, both light beams 34 and 36 arrive simultaneously with the result that a time varying environmental effect at this location has no effect since both light beams 34 and 36 see effectively the same optical path length changes in the optical fiber. As the location of the time varying environmental effect 52 moves away from the center 40 of the Sagnac loop 38 toward the central beamsplitter 32, the time delay between the arrival of the light beams 34 and 36 increases resulting in an increase in the net phase difference between the two light beams due to the time varying environmental effect 52 when they arrive at the central beamsplitter 32, providing the transit time of light through the Sagnac loop is short with respect to the characteristic time of the environmental effect 52, which is usually the case for acoustic waves. The line 56 of the graph in FIG. 1A shows the relative increase in the intensity of the signal from the sensor 22 as the position of the environmental effect moves from the center 40 of the Sagnac loop 38 toward the central beamsplitter 32.

In FIG. 2 a Sagnac/Michelson distributed sensor 100 is shown that uses a Mach-Zehnder detection system. A light source 102 that may be depolarized and of relatively broad spectral width, is used to couple light into the fiber end 104 resulting in the light beam 106 propagating to the central fiber optic beamsplitter 108, which splits the light beam 106 into the counterpropagating light beams 110 and 112 in the Sagnac loop 114. The light beam 110 propagates though the Sagnac loop 114 past the center 116 of the Sagnac loop 114 and onto the spectrally reflective element 118 that has a relatively narrow spectral bandwidth compared to the light source 102 and may be a fiber grating. The light beam 116 is then split into the light beam 120 that is reflected from spectrally reflective element 118 and light beam 122 that passes through the spectrally reflective element 118. The light beam 122 continues on to pass the phase modulator element 124 that may be used to dynamically bias the sensor 100 for optimum sensitivity of the Sagnac loop and to generate a characteristic frequency with which to demodulate the system, and reaches the central beamsplitter 108. The light beam 112 propagates past the phase modulator 124 to the spectrally reflective element 118 where it is split into the reflected light beam 126 that returns to the central beamsplitter 108 via the phase modulator 124 and the light beam 128 that propagates through the spectrally reflective element 118 and returns to the central beamsplitter 108 passing the Sagnac loop center 116.

At the central beamsplitter 108, the light beams 122 and 128, which have both traversed the entire Sagnac loop 114, combine coherently and interfere with each other, causing an amplitude modulated light beam 130 to be directed through the coupler 132 where a portion of the beam 130 is split into the light beam 134 and directed to an output detector 136. When a time varying environmental effect 138 that has a characteristic time period that is slow compared to the transit time of light through the Sagnac loop 114, is directed at a portion of the Sagnac loop 114 that is offset from the center of the loop 116, the relative phase between the light beams 122 and 128 is modulated resulting in a corresponding amplitude modulation of the combined light beam 130 and the light beam 134 which hits the detector 136. The amplitude of the electrical signal 140 from the detector 136 depends on the amplitude, frequency and position of the environmental signal 138. A portion of the amplitude modulated light beam 130 is split by the detector 132 into the amplitude modulated light beam 142, which in turn is split by the coupler 144 into the light beams 146 and 148. The light beam 146 passes though the fiber segment 150 of length $2L_1$ and then enters the fiber coupler 152. The light beam 148 passes through the fiber segment 154 of length $2L_2$ and then enters the fiber coupler 152. The lengths $2L_1$ and $2L_2$ are chosen so that they match twice the length $L_1$ corresponding to the clockwise distance along the Sagnac loop 114 from the central beamsplitter 108 to the spectral reflector 118 and twice the length $L_2$ corresponding to the counterclockwise distance along the Sagnac loop 114 from the central beamsplitter 108 to the spectral reflector 118. The two beams 146 and 148 do not interfere because the difference between the lengths $2L_1$ and $2L_2$ is substantially greater than the coherence length of the light source 102 and these light beams originate from the counterpropagating beams 122 and 128 that traverse nearly identical paths in the Sagnac loop 114. Each of the beams 146 and 148 split at the beamsplitter 152 and combine into the amplitude modulated light beams 156 and 158 that are directed to output detectors 160 and 162. The signals carried by these light beams 156 and 158 are dependent on the amplitude, frequency and position of the environmental signal as represented graphically by the dashed line 164 of FIG. 2A.

The light beams 126 and 120 which have reflected from the spectrally reflective element 118 combine at the central beamsplitter 108 but do not combine coherently as the difference in the optical pathlengths they have traversed is much greater than the coherence length of these light beams. A portion of these combined light beams 166 is directed to the beamsplitter 132 where it is split into the light beams 168 and 170. The light beam 168 is directed toward the detector 136 and since the beams do not interfere, the beam 168 does not generate an output signal. The light beam 170 passes through the beamsplitter 144 and is split into the light beams 172 and 174. The light beam 172 passes through the fiber segment 150 of length $2L_1$ and the light beam 174 passes through the fiber segment 154 of length $2L_2$. Thus when the two light beams 172 and 174 recombine on the beamsplitter 152 a portion of these beams have been traversed pathlengths that are nearly matched and the two beams interfere. The resultant amplitude modulated beams 176 and 178 are directed toward the output detectors 160 and 162. The electrical outputs 182 and 184 from the detectors 160 and 162 due to the action of the environmental signal 138, are proportional to the amplitude of the signal 138 as represented by the curve 180 and they also contain the information from the Sagnac interferometer, which is position independent. By inputting the signals 182, 184 and 140 into an electronic processor 186, the response of the Sagnac interferometer can be subtracted so that the Michelson interferometric output, which represents the amplitude, can be determined resulting in the output 188. By taking the ratio of the output 188 to the Sagnac position dependent signal, the position of the environmental effect 138 can be determined as the output 190.

FIG. 2B discloses another embodiment of the Sagnac/Michelson distributed fiber sensor with alternative readout optics. In this case, the amplitude modulated beam 130, due to counterpropagating light beams 122 and 128 in the Sagnac interferometer loop, is directed to the fiber coupler 144 and split into the light beams 146 and 148. The light beam 146 traverses the fiber segment 150 that is of length $2L_1$ and reaches the coupler 152. The light beam 148 traverses the fiber segment 154 that is of length $2L_2$ and reaches the coupler 152. The light beams 146 and 148 do not interfere because the optical pathlength difference between the fiber segments 150 and 154 greatly exceeds the coherence length of the light source 102. The two beams 146 and 148 combine at the coupler 152 and are split into the amplitude modulated light beams 156 and 158 that are directed toward the detectors 160 and 162. The output signals, due to the beams 156 and 158, are representative of the Sagnac interferometer response to the action of the environmental effect 138. The light beam 166, which is derived from the light beams 120 and 126 that are reflected from the spectral reflection element 118, is directed toward the beamsplitter 144, which splits the light beam 166 into the light beams 172 and 174. The light beam 172 traverses the fiber segment 150 to reach the beamsplitter 152 while the light beam 174 traverses the fiber segment 154 to reach the beamsplitter 152. The light beams 172 and 174 will interfere with each other when they combine on the beamsplitter 152 provided they traverse optical pathlengths that are within the coherence length of the light source 102. The pathlength control elements 200 and 202 control the length of the segments 150 and 154 which are nominally centered about $2L_1$ and $2L_2$ respectively so that interference of the beams 172 and 174 occurs. The electronic control unit 204 is designed so that via the electrical lines 206 and 208, the pathlength control elements 200 and 202 can be scanned so that the beams 172 and 174 no longer interfere as the mismatch between the segments 150 and 154 is sufficient to be greatly outside the coherence length of the beams 172 and 174. In this way the electrical outputs 210 and 212 from the detectors 160 and 162 will be representative of the Sagnac only and the Sagnac plus Michelson signals as the pathlength controllers 200 and 202 are being scanned through their range allowing the electronic control unit 204 to derive the position output 214 and the amplitude output 216 of the environmental signal 138

Figure 2C:
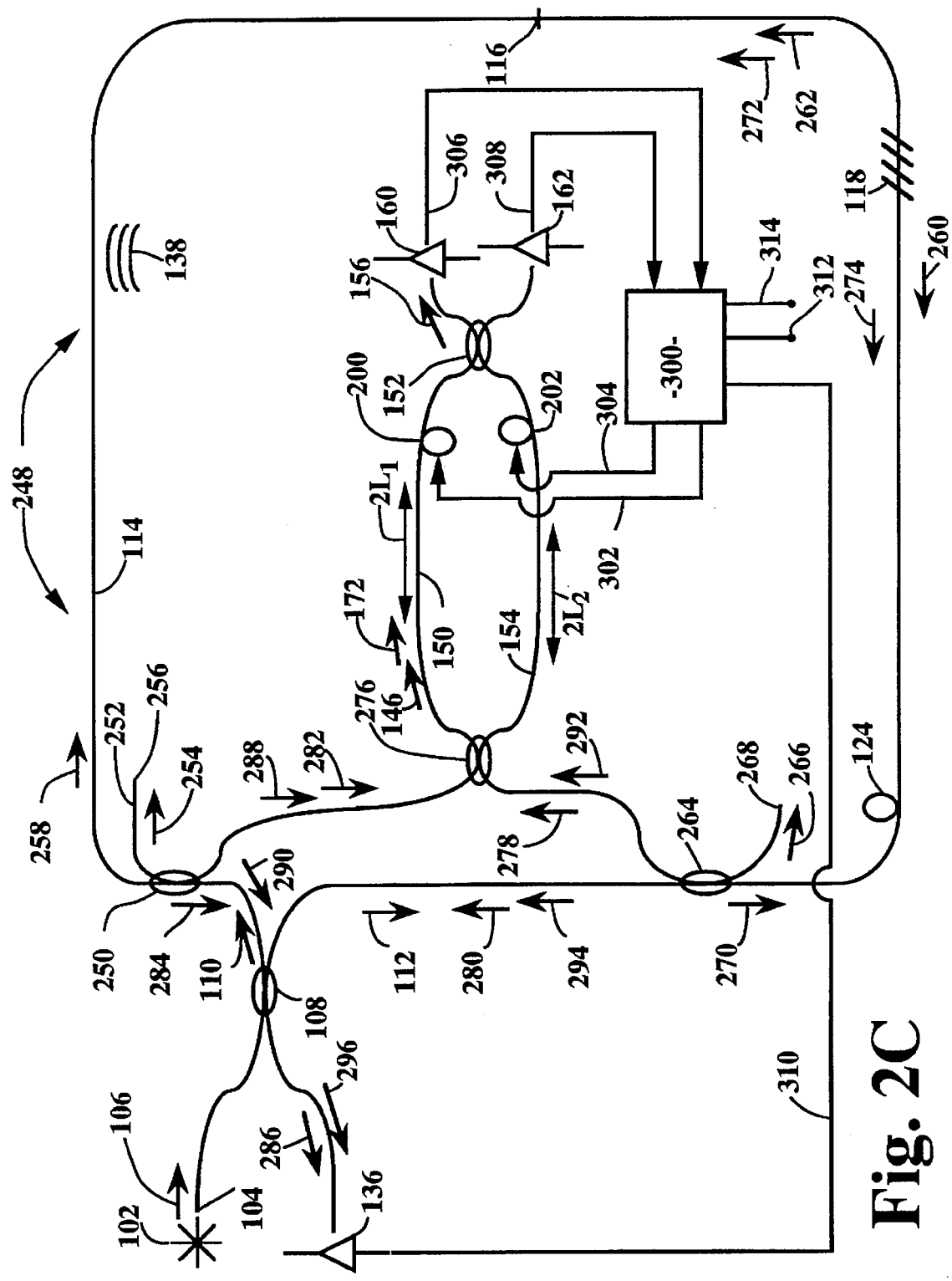
FIG. 2C is a diagram that illustrates a Sagnac interferometer with a spectral reflector placed in the Sagnac loop to form a Sagnac/Michelson sensing system with a Mach-Zehnder interferometric readout detection system that is placed to avoid cross talk with the Sagnac interferometer detector.

The system 248 of FIG. 2C is another embodiment of the Sagnac/Michelson distributed sensor that uses a Mach-Zehnder readout. In this case, the objective is to completely separate the signals from the Sagnac and Michelson interferometers minimizing crosstalk. The clockwise propagating light beam 110 reaches the beamsplitter 250 that taps off a portion of the light beam 110 into the port 252. This light beam 254 exits the system 248 via the terminated end 256. The other portion of the light beam 110, light beam 258 continues to circulate clockwise through the Sagnac loop 114, past the Sagnac loop midpoint 116 and onto the spectral reflecting element 118. A portion of the light beam 258 is transmitted through the spectral reflector 118 as the light beam 260 and a portion is reflected as the light beam 262. The counterclockwise propagating light beam 112 is split by the beamsplitter 264 into the beam 266 that exits the system via the terminated end 268. The other portion of the light beam 112 is split into the light beam 270 that passes the phase modulator 124 and reaches the spectrally reflective element 118. A portion of the light beam 270 passes through the element 118 as the light beam 272 and continues to propagate counterclockwise through the Sagnac loop 114. A second portion of the light beam 270 reflects off the element 118 as the light beam 274.

The light beam 260 continues around the Sagnac loop 114 clockwise, passing the phase modulator 124, and a portion of this light beam is directed by the beamsplitter 264 toward the beamsplitter 276 as the light beam 278. The other portion of the light beam 274, light beam 280, is directed by the beamsplitter 264 toward the central fiber beamsplitter 108.

Similarly the light beam 272 propagates counterclockwise about the Sagnac loop 114 and reaches the beamsplitter 250, where a portion of the light beam 272 is directed by the beamsplitter 250 toward the beamsplitter 276 as the light beam 282. The other portion of the light beam 274, light beam 284, is directed by the beamsplitter 250 toward the central fiber beamsplitter 108. Both the light beams 282 and 278 are split by the beamsplitter 276 into the fiber segments 150 and 154 and recombine at the beamsplitter 152. When the light beams originating from light beams 282 and 278 combine, there is no interference or amplitude modulated signal to be detected as the optical path length difference generated by the fiber segments 150 and 154 greatly exceeds the coherence length of these light beams. The two light beams 280 and 284 that have each traversed the Sagnac loop in opposite directions interfere with each other at the central fiber beamsplitter 108 and result in the amplitude modulated light beam 286 that is directed toward the Sagnac interferometer monitoring detector 136.

The light beam 262 that is reflected off the spectrally reflective element 118 is split by the beamsplitter 250 into the light beams 288 and 290. The light beam 274 that is reflected off the spectrally reflective element 118 is split by the beamsplitter 264 into the light beams 292 and 294. The light beams 290 and 294 combine on the central beamsplitter 108 and a new light beam 296 results that is directed at the detector 136. However since the difference in optical pathlengths traversed by the light beams 290 and 294 greatly exceed their coherence lengths, interference does not result and the light beam 296 is not amplitude modulated resulting in no signal on the detector 136. The light beams 288 and 292 are split by the beamsplitter 276 into the fiber segments 150 and 154 so that when they recombine at the beamsplitter 152, a portion of these light beams will be optically path length matched so they interfere coherently. The optical pathlength controllers 200 and 202 can be adjusted by the electronic controller 300, via the electrical signals 302 and 304, for optimum response of the electrical signals 306 and 308 from the detectors 160 and 162. The electrical controller 300 also receives the Sagnac interferometer signals 310 from the detector 136. Since crosstalk from the Sagnac and Michelson interferometer portions of the system 248 have been minimized and can be monitored continually, the electronic controller 300 requirements are minimized and the amplitude output 312 is derived directly from the Michelson output and the position output 314 is derived from the ratio of the Sagnac and Michelson interferometer outputs 310, and 306 and 308.

Figure 3:
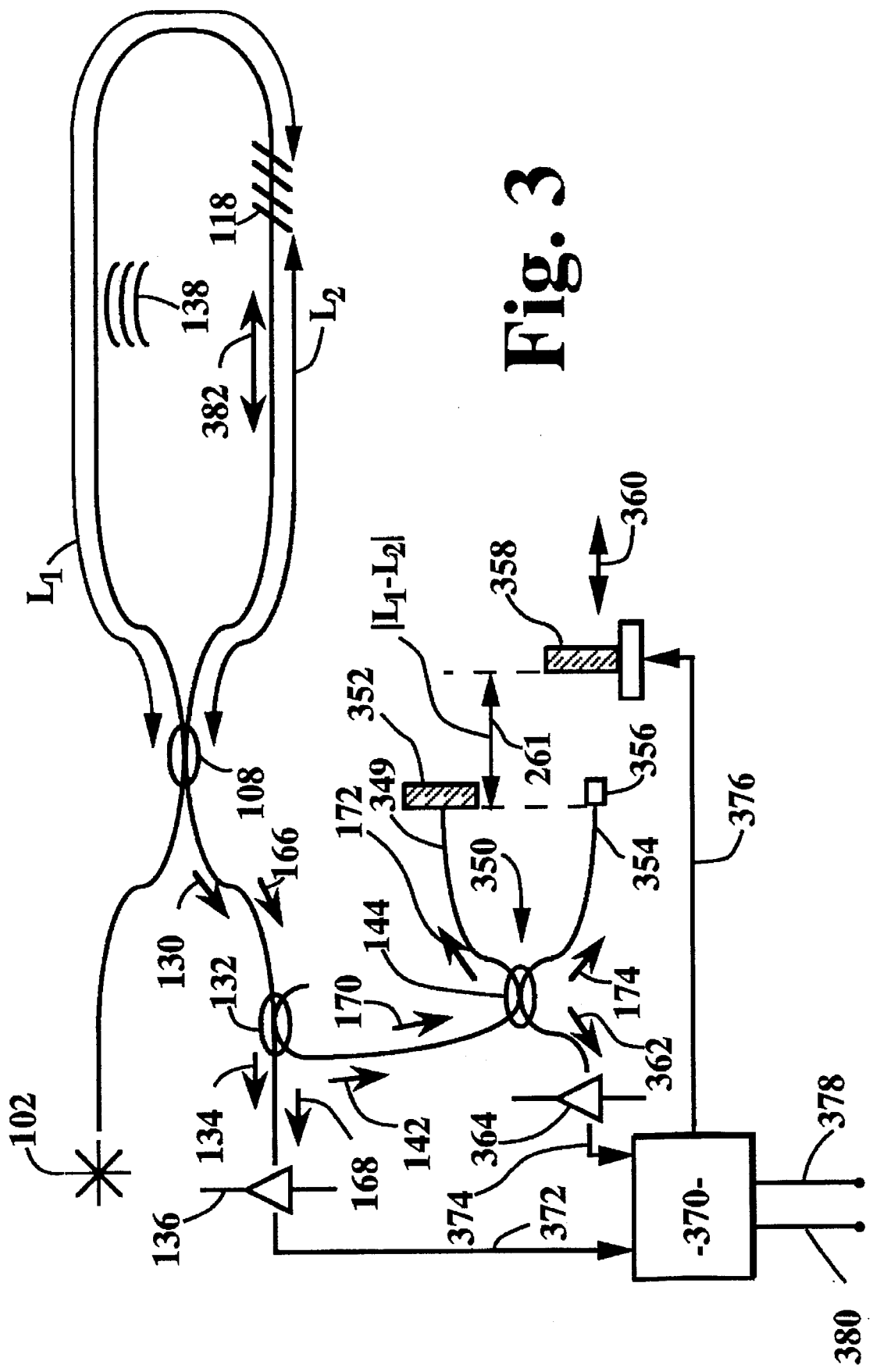
FIG. 3 is an optical circuit diagram of a Sagnac interferometer with a spectral reflector placed in the Sagnac loop to a form a Sagnac/Michelson sensing system with a variable Michelson interferometer readout detection system.

FIG. 3 illustrates an embodiment 348 of the Sagnac/Michelson distributed sensor that uses a variable Michelson interferometer to read out the Michelson interferometer information. As in the case of FIG. 2 the Sagnac interferometer information is carried by the light beam 134 to the detector 136. The Michelson information is carried by the light beam 170. When the light beam 170 impinges on the beamsplitter 144, it splits into the light beams 172 and 174. The light beam 172 propagates down one leg 349 of the Michelson readout interferometer 350 and is reflected back via the end mirror 352. The light beam 174 propagates down the other leg 354 of the Michelson readout interferometer 350 and exits the end of the fiber as a collimated light beam 350 through the lens assembly 356. The light beam 174 then reflects off the mirror 358, which is mounted on a variable positioner 360 used to control the optical pathlength difference 261 between the two legs 349 and 354 of the readout Michelson interferometer 350. The light beams 172 and 174 reflect back and if the optical pathlength difference between the legs 350 and 354 is set within the coherence length of the light beam 170, they will interfere when combined on the beamsplitter 144. A portion 362 of the combined light beam is directed by the beamsplitter 144 into the Michelson readout output detector 364. The light beam 142 carries the Sagnac amplitude modulated signal and it is split and recombined by the beamsplitter 144 without interference as the optical offset of the Michelson readout interferometer 350 is maintained to be much greater than the coherence length of the light source 102. The electronic controller 370 receives the Sagnac electrical signal 372 from the detector 136, the Michelson and Sagnac electrical signals 374 from the detector 364, and controls the optical offset between the two legs of the Michelson readout interferometer 350 by scanning the position of the mirror 358 via the positioner 360 controlled by an electrical signal 376. The position of the mirror 358 may be scanned through regions where the optical offset is sufficiently great that the Michelson signal disappears allowing a calibration on the level of the Sagnac signal. The electronic controller 370 subtracts out the Sagnac signal 372 from the Michelson/Sagnac electrical output 374 to derive the environmental amplitude output 378 and takes the ratio of the Sagnac signal 372 and derived Michelson output to determine the position output 380. In addition to measuring the amplitude and position of time varying environmental effects, slowly varying environmental signals 382 due to such causes as strain may be measured by the Michelson and Mach-Zehnder readout detectors of FIGS. 2B, 2C, and 3, and 3A, 3B, 4, and 5 to follow, by adjusting the optical pathlength offset to obtain maximum signal levels.

Figure 3A:
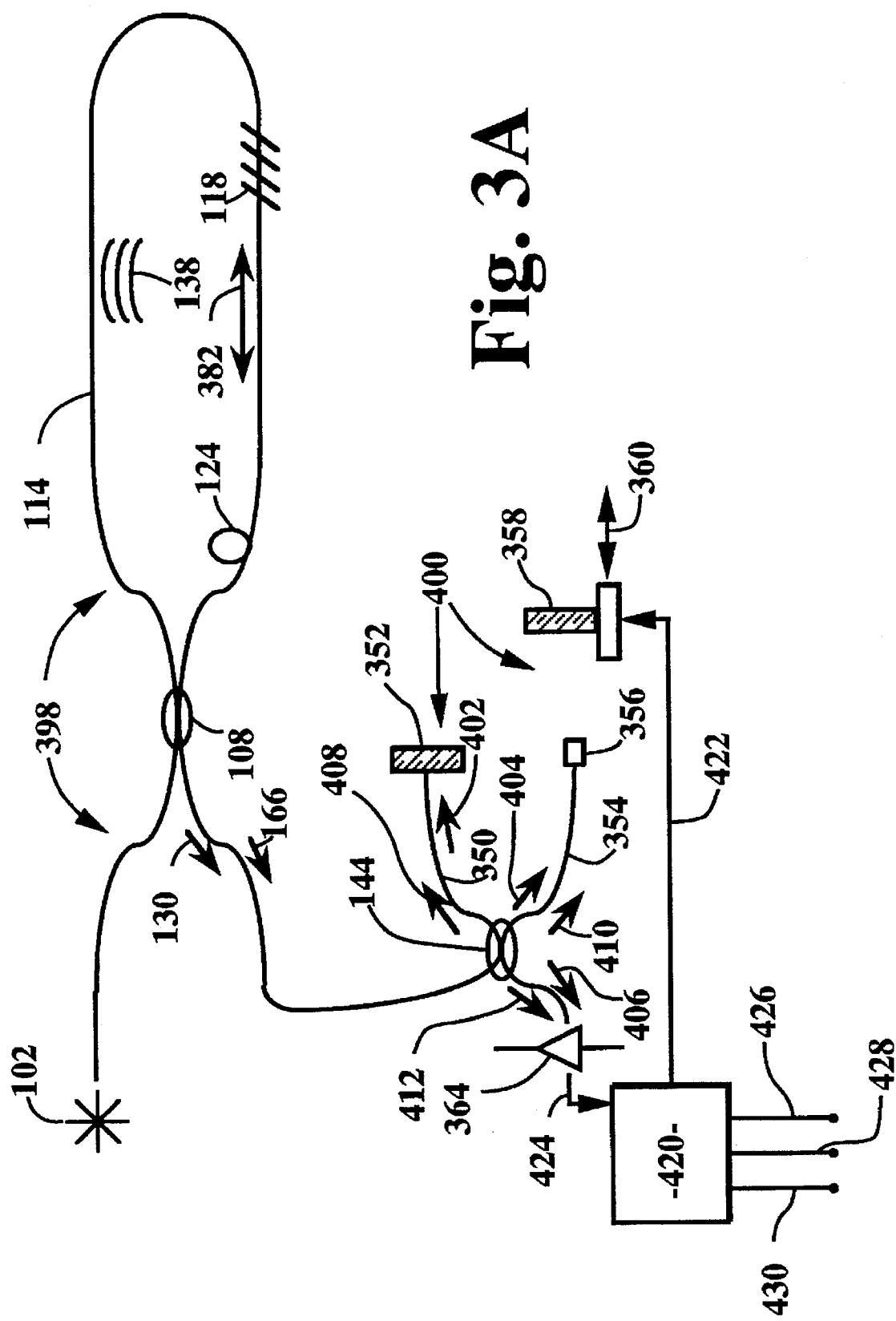
FIG. 3A is an optical circuit diagram of a Sagnac interferometer with a spectral reflector placed in the Sagnac loop to a form a Sagnac/Michelson sensing system with a variable Michelson interferometer readout detection system that is uses scanning to read out both Sagnac and Michelson outputs.

FIG. 3A shows an embodiment 398 of the Sagnac/Michelson distributed sensor with a variable Michelson readout detector 400. The light beam 130 that contains the amplitude modulated Sagnac interferometer derived environmental signal is split by the beamsplitter 144 into the light beams 402 and 404, which propagate down the legs 350 and 354 of the Michelson readout detector 400. The light beams 402 and 404 reflect off the mirrors 352 and 358 respectively and combine in the beamsplitter 144, a light beam portion 406 of which is directed to the output detector 364. The light beam 166, which contains the information from the Michelson interferometer portion of the Sagnac/Michelson interferometer is split by the beamsplitter 144 into the light beams 408 and 410. The light beam 408 propagates down the fiber leg 350 reflects off the mirror 352 and returns to the beamsplitter 144. The light beam 410 propagates down the fiber leg 354, is collimated by the lens assembly 356 and reflected by the variable position mirror 358 back into the fiber leg 354, where it returns to the beamsplitter 144. If the position of the variable position mirror 358 is such that the two legs of the Michelson readout interferometer 400 are offset so that the offset of the Michelson interferometer formed by the spectral reflector 118 in the Sagnac loop 114 is counterbalanced to within the coherence length of the light beam 166, then the two light beams 408 and 410 will interfere with each other and the portion of the combined light beams directed toward the detector 364 by the beamsplitter 144 will contain a signal representative of the amplitude of the environmental effect 138. The electronic controller 420 scans the mirror 358 via the driver 360 with an electrical signal 422. The electrical output 424 from the detector 364 is directed to the electrical controller. The electrical controller 420 then scans the mirror 358 through positions with the driver 360 to determine the peak signal from the Michelson interferometer portion of the Sagnac/Michelson distributed sensor. This position can be used to determine slow environmental effects 382 such as strain. It also can be used to determine the amplitude of the time varying environmental signal 138. The outputs of the controller 420 are the absolute offset of the loop 426 determined by the position of the mirror 358 for maximum Michelson interferometer output, the amplitude of the time varying environmental effect 428 and the position 430.

Figure 3B:
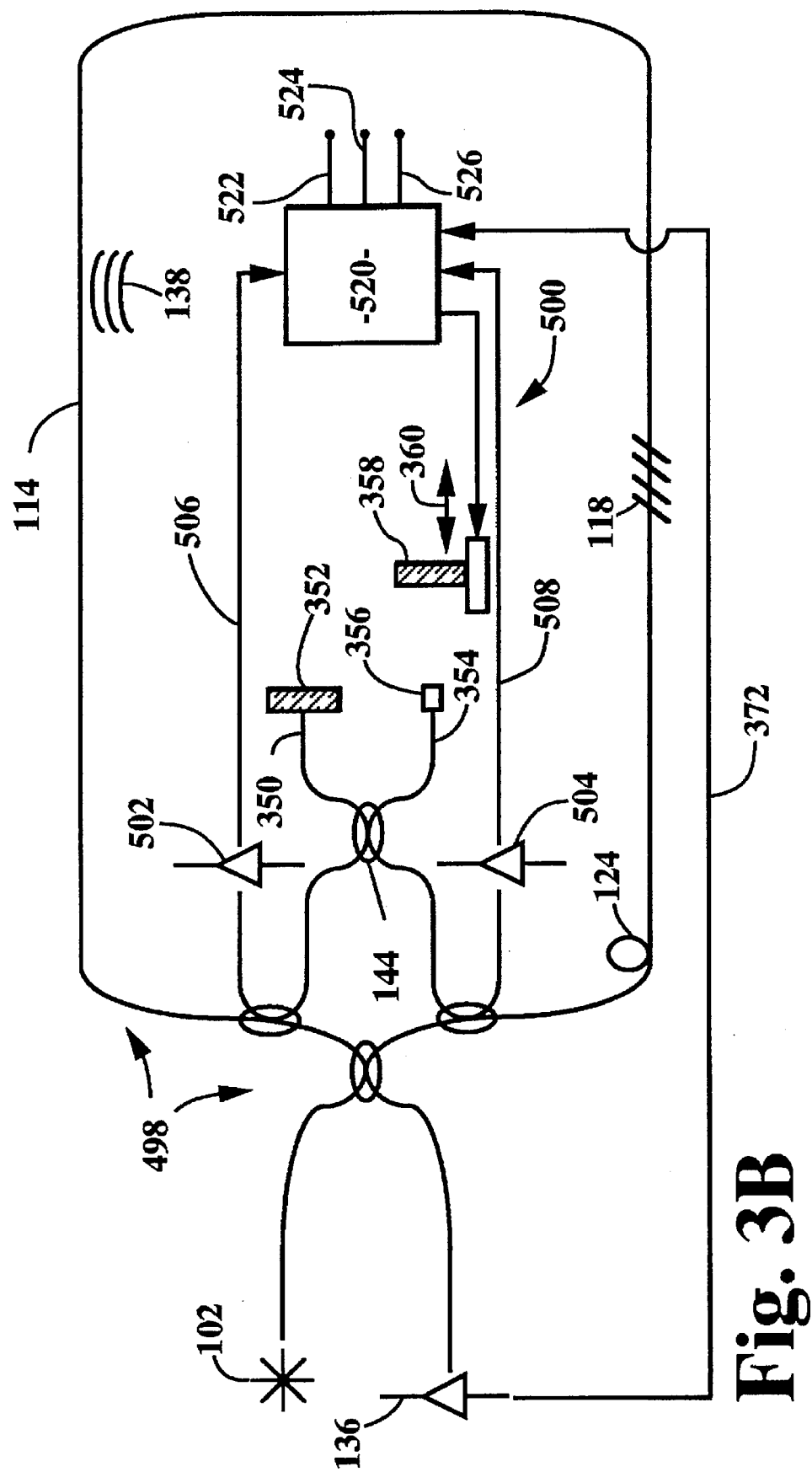
FIG. 3B is an optical circuit diagram of a Sagnac interferometer with a spectral reflector placed in the Sagnac loop to a form a Sagnac/Michelson sensing system with a variable Michelson interferometer readout detection system that is placed to avoid crosstalk with the Sagnac output detector.

FIG. 3B is a diagram of a Sagnac/Michelson distributed sensor 498 with a Michelson readout 500 that is placed so as to avoid crosstalk between the Sagnac and Michelson interferometer outputs in analogy to the system described in association with FIG. 2C with the Mach-Zehnder readout. Here, two detectors 502 and 504 are used to readout the Michelson interferometer generated output from the reflected beams off of the spectral reflective element 118 in the Sagnac loop 114. The electrical outputs 506 and 508 from these detectors 502 and 504 respectively, are then fed into the electrical controller 520 as well as the electrical output 372 from the Sagnac detector 136. The variable position mirror 358 is then positioned to optimize the strength of the Michelson generated signal allowing the determination of the absolute offset 522 of the spectral reflector 118, the amplitude 524 of the time varying environmental signal 138 and the position 526 of the time varying environmental signal 138.

Figure 4:
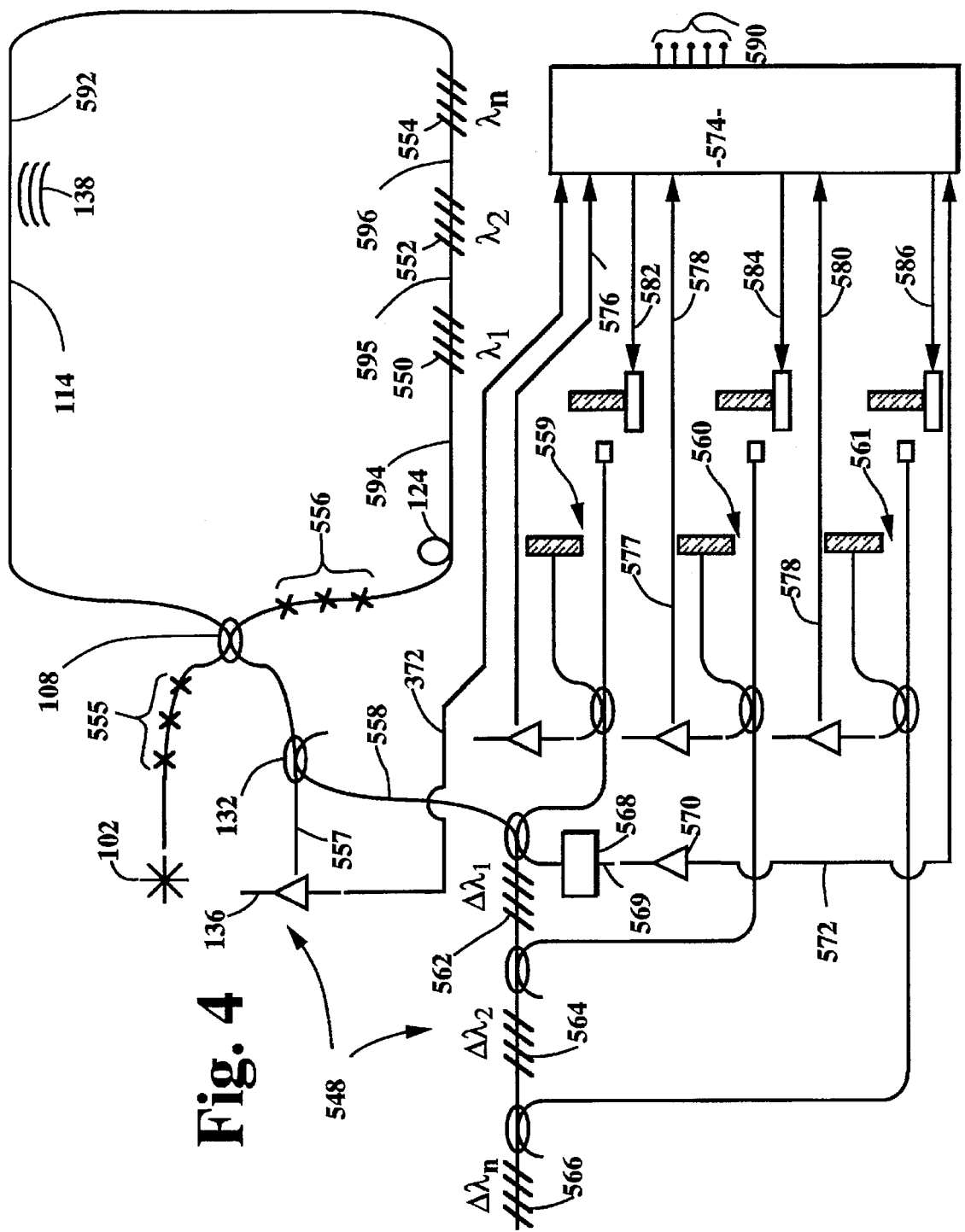
FIG. 4 is a diagrammatic view of a Sagnac interferometer with dynamic biasing and multiple spectral reflectors placed in the Sagnac loop to form a Sagnac/Michelson sensor system using multiple variable Michelson interferometers as readout detection systems.

FIG. 4 is a diagram illustrating how the present invention may be extended to include multiple spectral reflectors that may be fiber gratings in the Sagnac loop so that local and regional strain and other slowly varying environmental effects may be measured. In the system 548 shown, the spectral reflectors 550, 552, and 554 have been placed in the Sagnac loop 114 with relatively narrow band reflections around $\lambda_1$, $\lambda_2$, and $\lambda_N$. The loop 114 may be dynamically biased by the phase modulator 124 and light from the source 102 depolarized by the Lyot depolarizing elements 555 and 556. The elements 555 and 556 would be used if conventional single mode optical fiber is used primarily in the system of FIG. 4. If polarization preserving elements or a depolarized light source 102 were used, these elements need not be used. The Sagnac loop readout detector 136 on one of the output legs 557 of the beamsplitter 132 is used to pick up the environmental signals from the Sagnac loop, the signals from the various Michelson interferometers formed in the Sagnac loop 114 being incoherent when they reach the detector 136. The other output leg 558 of the beamsplitter 132 is directed toward a series of Michelson readout units 559, 560, and 561. Spectral reflectors 562, 564 and 566 that are centered about the same wavelengths $l_1$, $l_2$, and $l_N$ as the spectral reflectors 550, 552 and 554 but with wider spectral widths are used to separate the signals generated by the Michelson interferometers corresponding to the reflectors 550, 552 and 554. The spectral reflectors 550, 552, and 554, which may be fiber gratings, may change spectral characteristics with environmental effects. In particular where 550, 552 and 554 are fiber gratings these elements will change the spectral content of their reflections with strain and temperature. A spectral demodulator 568, which may be fiber gratings, scanning etalons, and/or tunable acoustooptic modulators, can be used to determine the spectral content of the reflectors 550, 552 and 554, and in turn the environmental effects acting upon them. The output 569 from the spectral demodulator 568 is monitored by the detector 570 and an electrical signal 572 representative of the output 569 is relayed to the electronic controller 574. The electronic controller receives signals 576, 578, and 580 from the Michelson readout units 559, 560, and 561, and controls their variable position mirrors during scanning by means of signals 582, 584 and 586. The outputs 590 from the electronic controller 574 may include the environmental effects locally on each of the spectral reflectors 550, 552 and 554, and regional environmental effects such as strain along the length of the Sagnac loop 114 between the reflectors 550, 552, 554 and the central beamsplitter 108. As an example, suppose the length of optical fiber 592 from the central beamsplitter 108 to the spectrally reflective element 554 is unconstrained but subject to temperature, while the fiber 594 between reflectors 554, 552, 550 and the central beamsplitter 108 is subject to strain and also temperature, which is assumed to be uniform along the Sagnac loop 114. The Michelson units 559, 560, and 561 will allow the determination by the controller 574 of the difference in optical pathlength clockwise and counterclockwise along the Sagnac loop 114 of each of the elements 550, 552 and 554 and the central beamsplitter 108. By taking the difference between these readouts, the strain along the fiber segments 594, 595, and 596 between the central beamsplitter 108 and the element 550, between 550 and 552 and between 552 and 554, may be determined by the controller 574.

FIG. 5 shows an embodiment 598 of the present invention similar to that of FIG. 4 with passive rather than dynamic biasing employed to optimize the sensitivity of the Sagnac loop 114. In this case a 3 by 3 coupler 600 has been used so that at the Sagnac output detectors 602 and 604, the relative phases of the output signal are 120 degrees apart avoiding signal fadeout in a manner analogous to that used to support fiber optic rotation sensors.

Figure 5A:
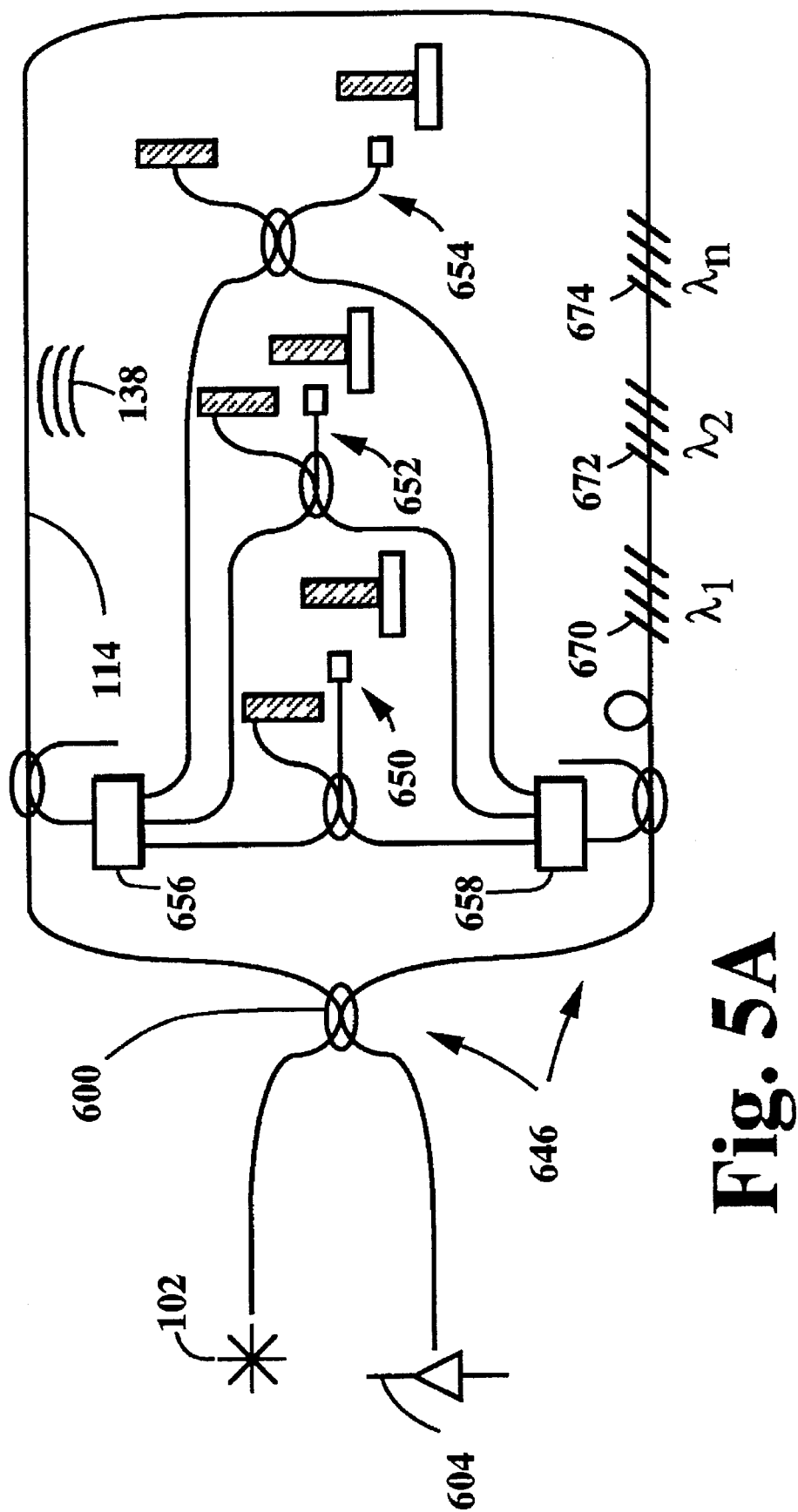
FIG. 5A is a diagrammatic view of a Sagnac interferometer with dynamic biasing and multiple spectral reflectors placed in the Sagnac loop to form a Sagnac/Michelson sensor system using multiple variable Michelson interferometers as readout detection systems placed to avoid crosstalk with the Sagnac detector output.

FIG. 5A shows an embodiment 648 of the present invention where multiple Michelson readout units 650, 652 and 654 are supported in a configuration that is analogous to that described in association with FIG. 3B. Here there is isolation between the Sagnac and Michelson interferometers allowing continuous monitoring without crosstalk. FIG. 5A also illustrates how the wavelength division multiplexing elements 656 and 658 are used to separate out the signals corresponding to the spectrally reflective elements 670, 672 and 674. The wavelength division multiplexing elements 656 and 658 could be fused biconical taper couplers, or diffraction grating based multiplexing devices. This type of element could also be used to support the embodiments of FIGS. 4 and 5 where a more specific wavelength division multiplexing approach is described.

Figure 6:
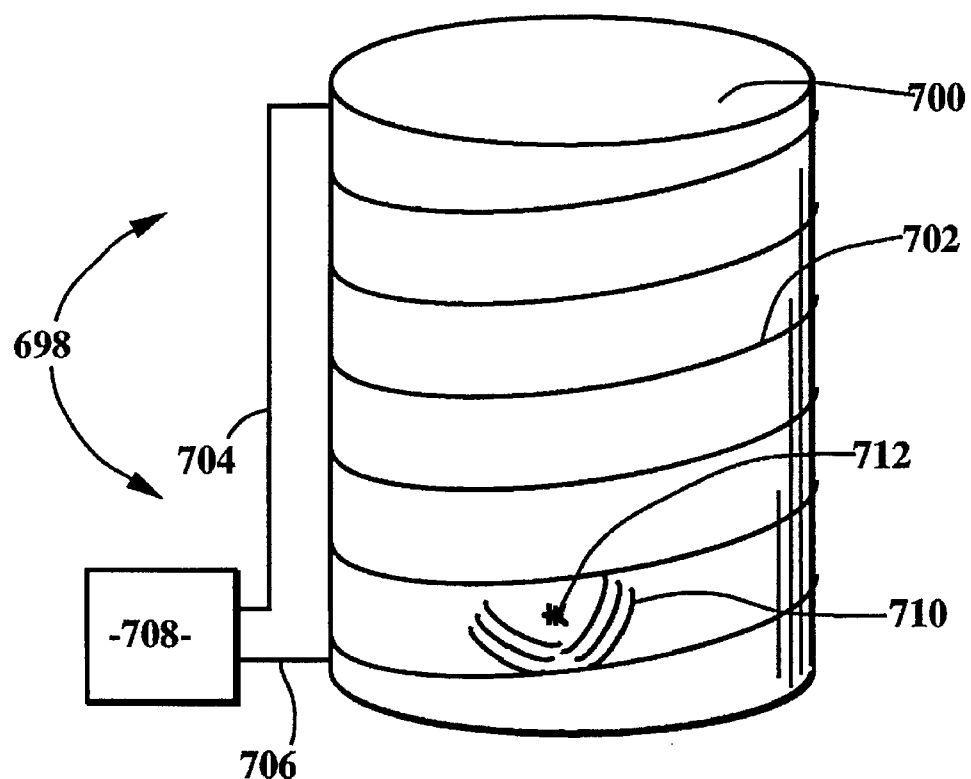
FIG. 6 is a diagram illustrating the configuration of an insect infestation detection system based on the measurement of the position and amplitude of acoustic signatures from the insects.

FIG. 6 illustrates an insect detection system 698 used to locate and identify insect infestations in a grain storage area. In FIG. 6, a grain storage structure 700 has been wrapped with a portion of a Sagnac fiber loop 702. This fiber loop section 702 may be conventional low cost single mode fiber used to support telecommunications. The fiber may be attached using tape or adhesives to the side of the structure 700 or built directly into the structure itself as is the case in the fiber glass composite utility poles described by Eric Udd et. al. in "Tension and Compression Measurements in Composite Utility Poles Using Fiber Optic Grating Sensors", Proceedings of SPIE, Vol. 2574, p. 14, 1995. The two output leads 704 and 706 of the portion of the Sagnac loop 702 are then connected to a Sagnac distributed sensor system similar to this invention or the prior inventions cited to locate acoustic emissions 710 that are associated with the insect infestation 712. Since insects often produce acoustic emissions in the frequency range of 10 kHz to 20 kHz, they provide an ideal signature. While only a single loop 702 is shown in FIG. 6, it is possible to employ multiple loops to more accurately locate infestations. Advantages of this approach over the prior art, which uses piezoelectric sensors, include a very low cost acoustic sensor that covers a wide area since the current cost of single mode telecommunication grade optical fiber is less than 10 cents a meter in small quantities. The response of the Sagnac distributed sensor can be tailored for optimum responsivity at the characteristic frequency of the insects, low frequency noise is optically filtered, and very large storage areas may be covered economically. The Sagnac distributed sensor 708 can also be connected and disconnected as needed by an inspector to service many grain storage structures.

Figure 7:
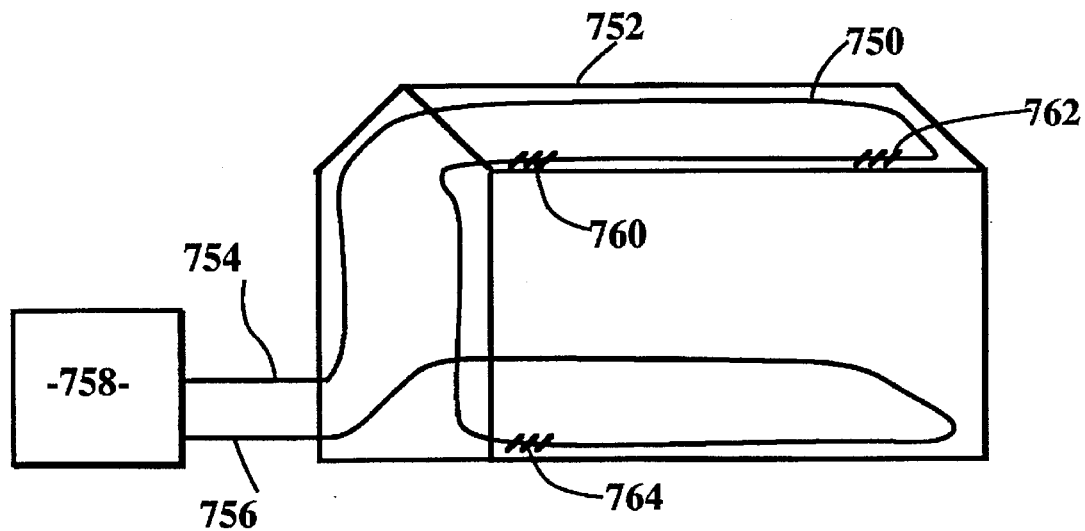
FIG. 7 is a diagram of a termite detection system that could also be used to assess structural integrity of the wooden structure.

FIG. 7 illustrates another application of the present invention. Here a portion of the Sagnac loop 750 is attached to the frame of a wooden building 752. The dual fiber leads 754 and 756 are connected to the Sagnac distributed sensor 758. This system could be used to monitor insect infestations in wooden buildings. By adding spectral reflectors 760, 762 and 764, which may be fiber gratings, to the Sagnac loop 750 attached to the structure 752, local strain measurements may be made to determine the structural integrity of the building 752 as well. The fiber loop 750 and the spectral reflectors 760, 762 and 764 that it may contain are relatively low cost and may be attached or built into the structure of the building 752. The Sagnac distributed sensor 758 could be connected and disconnected as needed and used to service numerous buildings.

Figure 8:
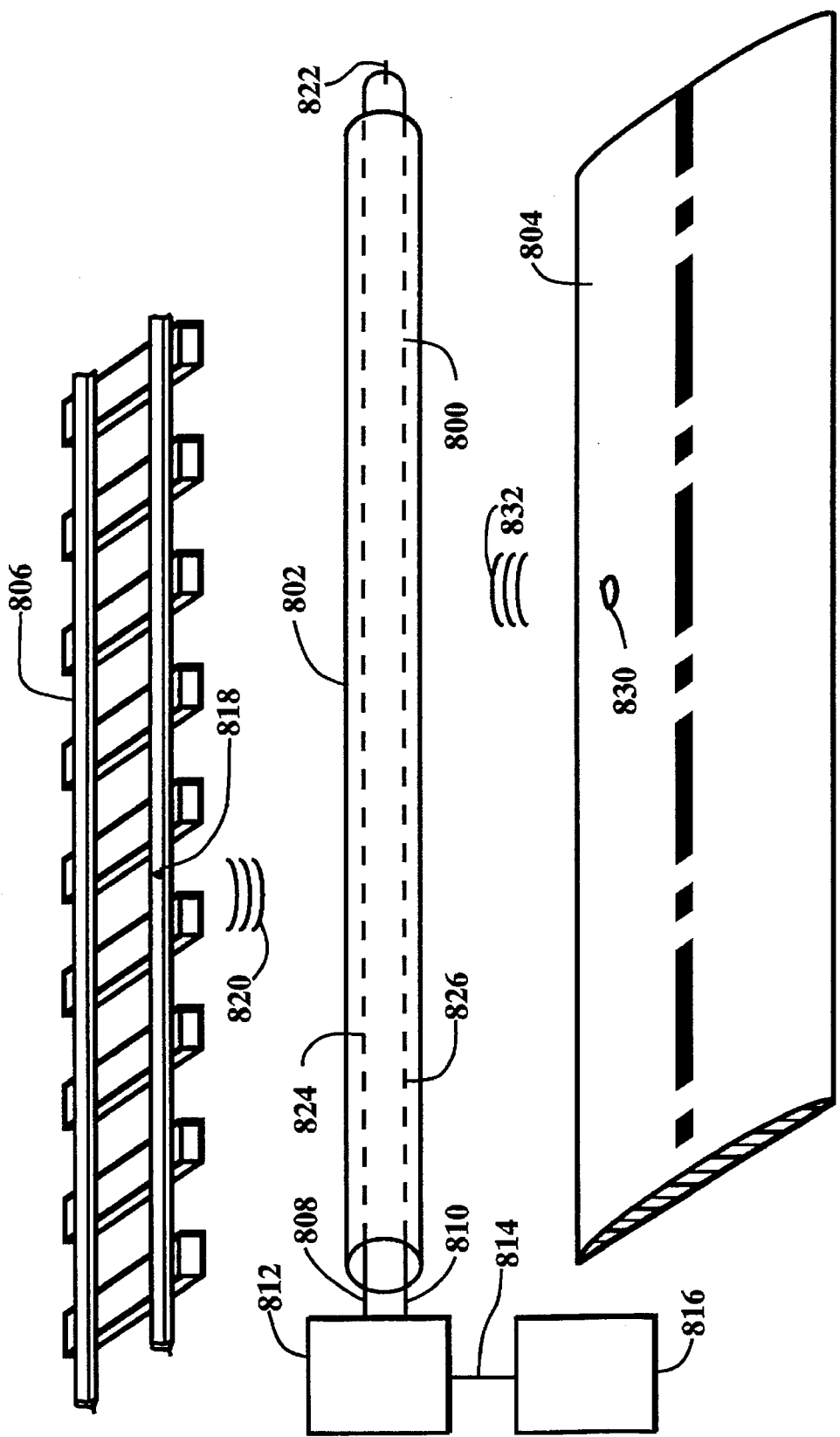
FIG. 8 is a diagram of a health monitoring system for railroad tracks and highways with the ability to measure the location and amplitude of acoustic signatures and if desired strain.

Throughout much of the world fiber cables have been laid parallel to highways and railroad tracks where right of way has been established. FIG. 8 illustrates how a Sagnac distributed sensor may be used in conjunction with these fiber cables to form health monitoring systems for railroads and highways. A portion of a Sagnac loop 800 is placed into a fiber cable 802 that is buried or located near a highway 804 and or railroad tracks 806. The ends 808 and 810 of the portion of the Sagnac loop 800 are attached to a Sagnac distributed sensor 812 whose output could be relayed back to a remote monitoring location via a connection 814 to a fiber optic telecommunication port 816. When a train passes by on the tracks 806, it may pass over a damaged area 818 of the tracks 806 producing an acoustic signature 820. The center 822 of the portion of the Sagnac loop 800 can be used to define two regions of the loop 800. The first region 824 is from the end 808 to the center 822. The second region 826 is from the center 822 to the end 810. The fibers comprising the regions 824 and 826 should be arranged so that their response to the acoustic signal 820 is different. This may be done by locating the fibers corresponding to 824 and 826 in different areas of the cable 802, coating the fibers with different coatings or changing their mounting within the cable 802 itself. The differential response of these fibers 824 and 826 then allows the Sagnac distributed sensor 812 to determine the position and location of the acoustic signal 820. This information can then in turn be relayed back to a remote location and a repair team sent out and or cautions sent to future trains. The highway 804 may develop potholes or other damage areas 830 that result in an acoustic signal 832 that can be measured and located by the Sagnac distributed sensor 812 and the fiber loop 800.

Figure 9:
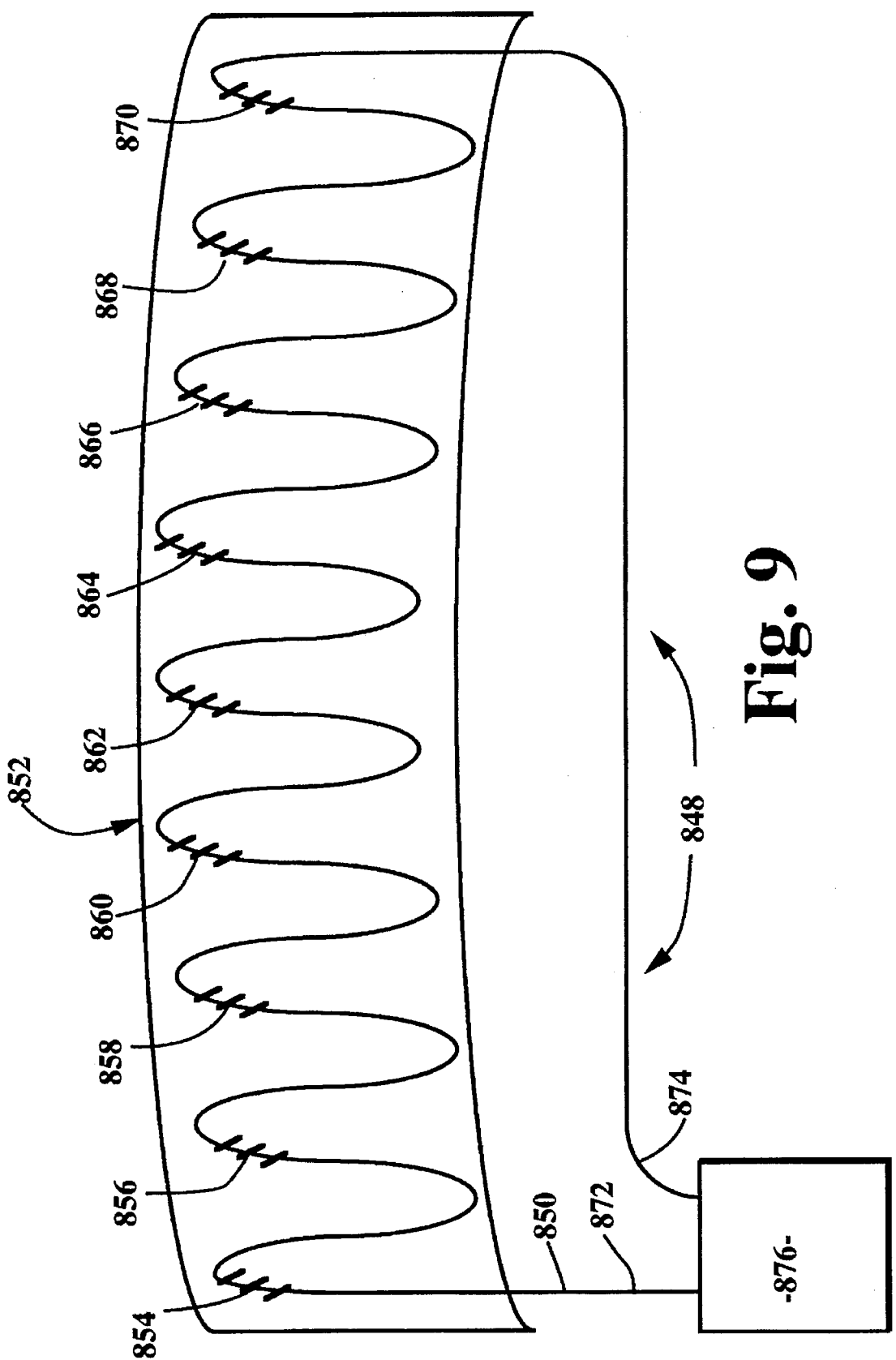
FIG. 9 is a diagram of a health monitoring system for a concrete structure such as a highway or dam with the ability to measure local strain and acoustic signatures.

FIG. 9 illustrates a system 848 that may be used to measure acoustics and strain in a large concrete structure such as a highway or dam. A portion of a Sagnac loop 850 is embedded or attached to the concrete structure 852. Spectral reflective elements 854, 856, 858, 560, 862, 864, 866, 868 and 870 that may be fiber gratings, are placed in the loop 850. The ends 872 and 874 of the loop 850 are connected to a Sagnac/Michelson distributed sensor 876 that can be used to determine the location and amplitude of a time varying environmental effect, such as a leak in the dam or traffic passing over the damaged area of a highway.

Changes in the strain profile between the spectral reflective elements 854, 856, 858, 860, 862, 864, 866, 868, and 870 can also be measured allowing highways to measure the weight and speed of passing vehicular traffic and strain profiles in dams for structural health assessment.

Figure 10:
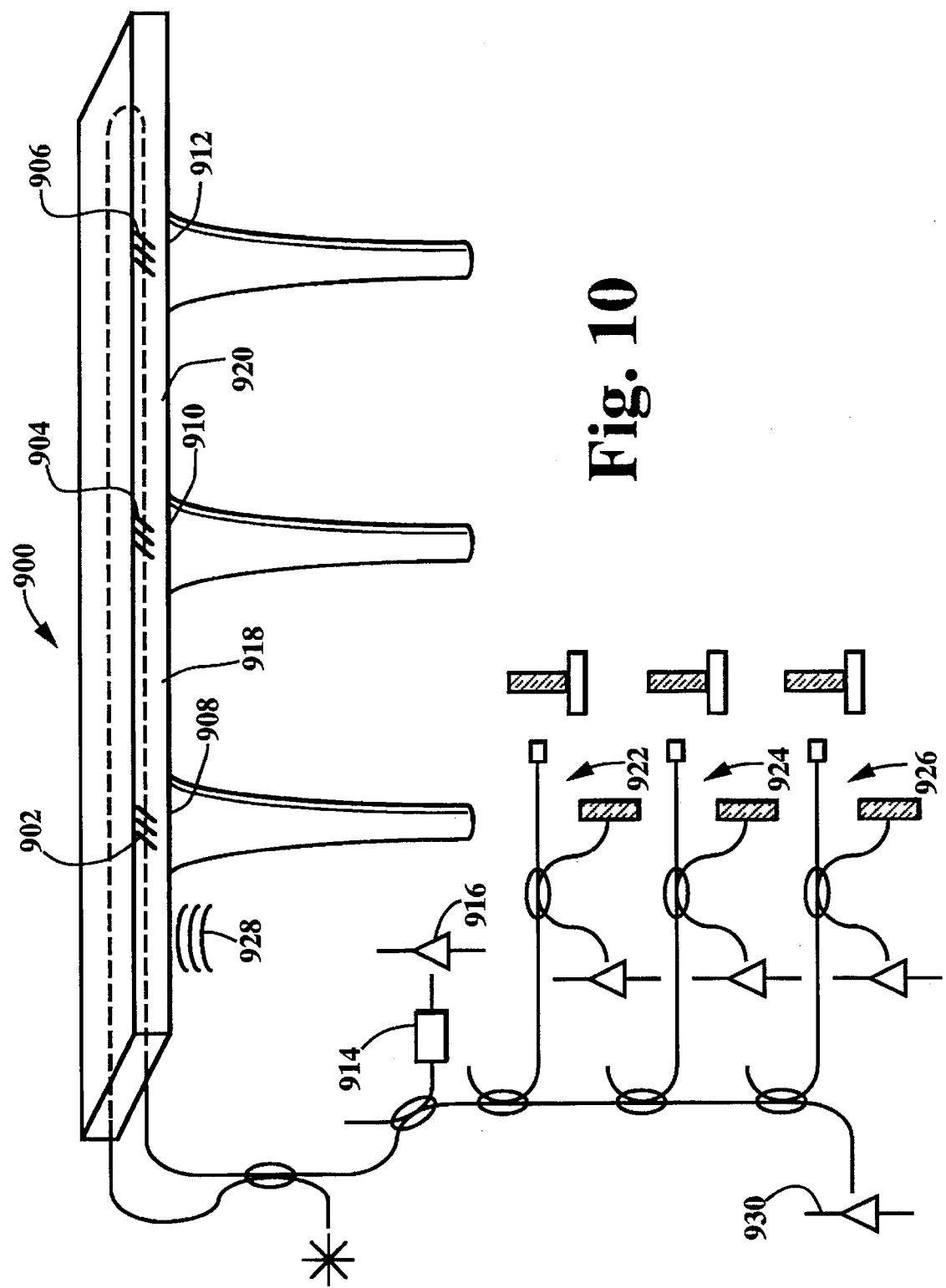
FIG. 10 is a health monitoring system for a bridge configured to measure acoustic signatures and strain.

FIG. 10 shows how a Sagnac/Michetson interferometer distributed sensor may be employed in a bridge structure 900. The spectral reflective elements 902, 904 and 906 are located near joint areas 98, 910 and 912 of the bridge structure 900. Local strain could be monitored at these joint location using the spectral demodulator 914 and the detector 916. Regional strain on the fiber sections 918 and 920 located between the spectral reflectors 902 and 904, and between 904 and 906 respectively, can be monitored by processing the outputs of the Michelson readouts 922, 924 and 926. The location and amplitude of an acoustic disturbance could be monitored by processing the output of the Sagnac detector 930 and one of the Michelson readouts 922, 924 or 926 as described in association with the earlier Figures.

Thus there has been shown and described novel fiber optic distributed sensors based on the Sagnac and Michelson interferometers and using spectral reflectors internal to the Sagnac loop. Many changes, modifications, variations, uses and applications of the subject invention will however become apparent to those skilled in the art after considering this specification and the accompanying drawings. All such changes, modifications, alterations and other uses and applications which do not depart from the spirit and scope of the invention are deemed to be covered by the invention, which is limited only by the claims that follow.

What is claimed is:

1. A sensor system to sense at least a first environmental effect, said system including:
    a first fiber optic beamsplitter having:
        a first arm;
        a second arm;
        a third arm; and
        a fourth arm;
    a first light source that produces a first beam of light into said first arm, said first fiber optic beamsplitter splitting said first beam of light into second and third beams of light on said third and fourth arms respectively;
    a first optical pathway connecting said third arm to said fourth arm; said first optical pathway having:
        a center;
    a first spectrally reflective element placed in said first optical pathway spaced from said center, said first spectrally reflective element producing from said second beam of light:
        a fourth beam of light that passes through said first spectrally reflective element; and
        a fifth beam of light that reflects from said first spectrally reflective element and that produces from said third beam of light:
            a sixth beam of light that passes through said first spectrally reflective element; and
            a seventh beam of light that reflects from said first spectrally reflective element, said fourth and sixth beam of light combining on said first beamsplitter to produce:
                an eighth beam of light directed into said second arm of said first beamsplitter, said fifth and seventh beam of light combining on said first beamsplitter to produce:
            a ninth beam of light directed into said second arm of said first beamsplitter; and
    detector means connected to said second arm of said first beamsplitter to receive said eighth beam of light to produce therefrom:
        a first output signal whose amplitude varies with position, frequency and amplitude of the first environmental effect on said first optical pathway and connected to said ninth beam of light to produce:
        a second output signal whose amplitude is representative of the first environmental effect independent of position and frequency of the first environmental effect.

2. The sensor system as defined in claim 1 where said first spectrally reflective element is a fiber grating.

3. The sensor system as defined in claim 1 where said detector means further include:
    a second beamsplitter having:
        a first arm;
        a second arm;
        a third arm; and
        a fourth arm, said first arm of said second beamsplitter being connected to said second arm of said first beamsplitter, said second beamsplitter producing from said eighth beam of light:
            a tenth beam of light in said third arm of said second beamsplitter; and
            an eleventh beam of light in said fourth arm of said second beamsplitter, and said second beamsplitter producing from said ninth beam of light:
            a twelfth beam of light in said third arm of said second beamsplitter; and
            a thirteenth beam of light in said fourth arm of said second beamsplitter; said sensor system further including:
    second detector means connected to said third arm of said second beamsplitter to receive said tenth and twelfth beams of light and produce therefrom:
        a third output signal whose amplitude varies with position, frequency and amplitude of the environmental effect on said first optical pathway;
    a third beamsplitter having:
        a first arm;
        a second arm;
        a third arm; and
        a fourth arm, said first arm of said third beamsplitter being connected to said fourth arm of said second beamsplitter;
    a fourth beamsplitter having:
        a first arm;
        a second arm;
        a third arm; and
        a fourth arm, said first arm of said fourth beamsplitter being connected to said third arm of said third beamsplitter and said second arm of said fourth beamsplitter being connected to said fourth arm of said third beamsplitter, said third beamsplitter producing from said eleventh beam of light:
            a fourteenth beam of light in said third arm of said third beamsplitter and said first arm of said fourth beamsplitter; and
            a fifteenth beam of light in said fourth arm of said third beamsplitter and said second arm of said fourth beamsplitter, and said third beamsplitter producing from said thirteenth beam of light:
            a sixteenth beam of light in said third arm of said third beamsplitter and in said first arm of said fourth beamsplitter; and a seventeenth beam of light in said fourth arm of said third beamsplitter and said second arm of said fourth beamsplitter, said fourteenth and fifteenth beams of light combining on said fourth beamsplitter to produce:
an eighteenth beam of light in said third arm of said fourth beamsplitter; and
a nineteenth beam of light in said fourth arm of said fourth beamsplitter, said sixteenth and seventeenth beams of light combining on said fourth beamsplitter to produce:
a twentieth beam of light in said third arm of said fourth beamsplitter; and
a twenty first beam of light in said fourth arm of said fourth beamsplitter; and
a second detector connected to said third arm of said fourth beamsplitter to receive said eighteenth beam of light and produce therefrom;
a fourth output signal whose amplitude varies with position, frequency and amplitude of the first environmental effect on said first optical pathway and to receive said twentieth beam of light and to produce therefrom:
a fifth output signal whose amplitude is position and frequency independent of the first environmental effect;
a third detector connected to said fourth arm of said fourth beamsplitter to receive said nineteenth beam of light and produce therefrom:
a sixth output signal whose amplitude varies with position, frequency and amplitude of the first environmental effect on said first optical pathway, and to receive said twenty first beam of light and produce therefrom:
a seventh output signal whose amplitude is position and frequency independent of the first environmental effect; and
a first electronic controller to receive said third, fourth, fifth, sixth, and seventh output signals and to produce said first output signal indicative of position of the first environmental effect and said second output signal indicative of the amplitude of the first environmental effect.

4. The sensor system as defined in claim 3 where said first optical pathway includes:
a first phase modulator to provide dynamic bias.

5. The sensor system as defined in claim 1 where said detector means further include:
a second beamsplitter having:
a first arm;
a second arm;
a third arm; and
a fourth arm, said first arm of said second beamsplitter being connected to said second arm of said first beamsplitter, said second beamsplitter producing from said eighth beam:
a tenth beam of light in said third arm of said second beamsplitter; and
an eleventh beam of light in said fourth arm of said second beamsplitter, said second beamsplitter producing from said ninth beam of light;
a twelfth beam of light in said third arm of said second beamsplitter; and
a thirteenth beam of light in said fourth arm of said second beamsplitter, said system further including:
a first detector connected to said third arm of said second beamsplitter to receive said tenth and twelfth beams of light and produce therefrom:

a third output signal whose amplitude varies with position, frequency and amplitude of the first environmental effect on said first optical pathway; and
a third beamsplitter having:
a first arm;
a second arm;
a third arm; and
a fourth arm, said first arm of said third beamsplitter being connected to said fourth arm of said second beamsplitter, said third beamsplitter producing from said eleventh beam of light;
a fourteenth beam of light in said third arm of said third beamsplitter; and
a fifteenth beam of light in said fourth arm of said third beamsplitter; and said third beamsplitter producing from said thirteenth beam of light:
a sixteenth beam of light in said third arm of said third beamsplitter;
a seventeenth beam of light in said fourth arm of said third beamsplitter; and
an eighteenth beam of light produced by said third beamsplitter by combining said fourteenth, fifteenth, sixteenth and seventeenth beams of light;
first reflecting means at the end of said third arm of said third beamsplitter that reflect said fourteenth and sixteenth beams of light back to said third beamsplitter;
first variable pathlength reflecting means at the end of said fourth arm of said beamsplitter that reflect back said fifteenth and seventeenth beams of light;
a second detector connected to said second arm of said third beamsplitter to receive said eighteenth beam of light and producing therefrom:
a fourth output signal whose amplitude varies with the amplitude, frequency and position of said first environmental effect; and
a fifth output signal whose amplitude is position and frequency independent; and
a first electronic controller to receive said third, fourth and fifth output signals and to produce therefrom said first and second output signals indicative of the position and amplitude of the first environmental effect.

6. The sensor system as defined in claim 5 where said first optical pathway includes:
a first phase modulator to provide dynamic bias.

7. The sensor system as defined in claim 1 where said detector means includes a variable Michelson interferometer readout including:
a second beamsplitter having:
a first arm;
a second arm;
a third arm; and
a fourth arm, said first arm of said second beamsplitter being connected to said second arm of said first beamsplitter, said second beamsplitter producing from said eighth beam of light:
a tenth beam of light in said third arm of said second beamsplitter; and
an eleventh beam of light in said fourth arm of said second beamsplitter, and producing from said ninth beam of light;
a twelfth beam of light in said third arm of said second beamsplitter; and
a thirteenth beam of light in said fourth arm of said second beamsplitter;
a first reflective surface positioned at the end of said third arm of said second beamsplitter:

a variable pathlength reflector at the end of said fourth arm of said second beamsplitter, said tenth and twelfth beams of light reflecting off said first reflective surface, and said eleventh and thirteenth beams of light reflecting off said variable pathlength reflector, and said tenth, eleventh, twelfth and thirteenth beams of light combining at said second beamsplitter to produce:
a fourteenth beam of light directed into said second arm of said second beamsplitter;
a first detector connected to the end of said second arm of said second beamsplitter to receive said fourteenth beam of light and produce therefrom:
a third output signal; and
an electronic controller to receive said third output signal and scan said first variable pathlength reflector so that an output indicative of the change in position of the first spectrally reflective element is obtained, and to produce said first and second output signals that are representative of the position and amplitude of the first environmental effect.

8. The sensor system as defined in claim 7 where said first optical pathway includes:
a first phase modulator to provide dynamic biasing.

9. The sensor system as defined in claim 1 where said detector means includes a variable Mach-Zehnder interferometer readout including:
a second beamsplitter having:
a first arm;
a second arm;
a third arm; and
a fourth arm, said first arm of said second beamsplitter being connected to said second arm of said first beamsplitter, said second beamsplitter producing from said eighth beam of light:
a tenth beam of light in said third arm of said second beamsplitter; and
an eleventh beam of light in said fourth arm of said second beamsplitter, and producing from said ninth beam of light:
a twelfth beam of light in said third arm of said second beamsplitter, and
a thirteenth beam of light in said fourth arm of said second beamsplitter;
a first variable optical pathlength;
a second variable optical pathlength, said third arm of said second beamsplitter being connected to said first variable optical pathlength, and said fourth arm of said second beamsplitter being connected to said second variable optical pathlength;
a third beamsplitter having:
a first arm;
a second arm;
a third arm; and
a fourth arm, said first arm of said third beamsplitter being connected to said first variable optical pathlength, and said second arm of said third beamsplitter being connected to said second variable optical pathlength, and said tenth, eleventh, twelfth, and thirteenth beams of light being combined on said third beamsplitter to produce:
a fourteenth beam of light in said third arm of said third beamsplitter, and to produce:
a fifteenth beam of light in said fourth arm of said third beamsplitter;
first detector positioned at the end of said third arm of said third beamsplitter to receive said fourteenth beam of light producing therefrom:
a third output signal;
a second detector positioned at the end of said fourth arm of said third beamsplitter to produce therefrom:
a fourth output signal; and
an electronic controller to control said first and second variable optical pathlengths and receive said third and fourth output signals to produce said first and second output signals of position and amplitude of the first environmental effect and the movement of said first spectrally reflective element.

10. The sensor system as defined in claim 9 where said first optical pathway includes:
a first phase modulator to provide dynamic bias.

11. The sensor system as defined in claim 1 further including:
a first detector, wherein said first beamsplitter is a three by three coupler having:
a fifth connected to said first detector for passive biasing.

12. The sensor system as defined in claim 1 where said first optical pathway includes:
multiple spectrally reflective elements, and wherein said first detector means include:
multiplexed multiple interferometric detectors.

13. The sensor system as defined in claim 12 where said optical pathway includes:
a first phase modulator to provide dynamic bias, and said first detector means include;
a spectral demodulator and detector to monitor environmental effects on said multiple spectrally reflective elements.

14. A sensor system to sense one or more environmental effects said system including:
a first fiber optic beamsplitter having:
a first arm;
a second arm;
a third arm; and
a fourth arm;
a first light source that produces a first beam of light into said first arm, said first fiber optic beamsplitter splitting said first beam of light into second and third beams of light on said third and fourth arms of said first fiber optic beamsplitter respectively;
a second fiber optic beamsplitter having:
a first arm;
a second arm;
a third arm; and
a fourth arm;
a third fiber optic beamsplitter having:
a first arm;
a second arm;
a third arm; and
a fourth arm, said third arm of said first beamsplitter being connected to said first arm of said second beamsplitter, and said fourth arm of said first beamsplitter being connected to said second arm of said third beamsplitter;
a first optical pathway connecting said third arm of said second beamsplitter to said fourth arm of said third beamsplitter, said first optical pathway having:
a center;
a first spectrally reflective element placed in said first optical pathway spaced from said center; and
a first interferometric readout detector connected to said second arm of said second beamsplitter, said first interferometric detector being connected to said first arm of said third beamsplitter to receive a light signal from said spectrally reflective element that is independent of frequency and position;

a first detector connected to said second arm of said first beamsplitter to receive a light signal that is dependent on position, amplitude and frequency of a first environmental effect on said first optical pathway; and an electronic controller to receive signals from said first detector and said first interferometric detector to produce outputs therefrom indicating the movement of said first spectrally reflective element, and the position and amplitude of the first environmental effect.

15. The sensor system as defined in claim 14 further including:
  a second detector, said first beamsplitter including:
    a three by three coupler having:
      a leg connected to said second detector for passive biasing.

16. The sensor system as defined in claim 14 where said first optical pathway includes:
  a first phase modulator to provide dynamic bias.

17. The sensor system as defined in claim 16 where said first interferometric readout detector is a Mach-Zehnder interferometer.

18. The sensor system as defined in claim 16 where the first interferometric readout detector is a variable Michelson interferometer.

19. The sensor system as defined in claim 16 where said first optical pathway includes:
  multiple spectrally reflective elements, and wherein said sensor system includes:
  wavelength division multiplexing elements; and
  multiple interferometric detectors multiplexed by said wavelength division multiplexing elements.

20. A sensor system to sense an environmental effect, said system including:
  a light source for producing light;
  an optical loop having:
    a center;
  a beamsplitter connected to receive the light from said light source and split the light from said light source to travel in clockwise and counterclockwise directions about said loop;
  a spectrally reflective element placed in said optical loop spaced from said center, said spectrally reflective element reflecting a portion of the light traveling in counterclockwise direction into partial spectrum light traveling clockwise in said optical loop, and reflecting a portion of the light traveling in clockwise direction into partial spectrum light traveling counterclockwise in said optical loop, the reflected partial spectrum light traveling clockwise and counterclockwise combining at said beamsplitter, and the light traveling clockwise and counterclockwise missing the reflected partial spectrum light combining at said beamsplitter;
  detector means connected to receive the combined reflected partial spectrum light to produce therefrom:
    a first output signal whose amplitude varies with position, frequency and amplitude of the environmental effect on said optical loop, said detector means also being connected to receive the combined light missing the reflected partial spectrum light to produce therefrom:
    a second output signal whose amplitude is representative of the environmental effect independent of position and frequency of the environmental effect.

* * * * *